(12) United States Patent
Gallagher

(10) Patent No.: US 7,547,482 B2
(45) Date of Patent: Jun. 16, 2009

(54) PASSIVE MICROCOOLANT LOOP FOR AN ELECTROCHEMICAL FUEL CELL

(75) Inventor: Emerson R Gallagher, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 684 days.

(21) Appl. No.: 11/019,084

(22) Filed: Dec. 21, 2004

(65) Prior Publication Data

US 2006/0134483 A1    Jun. 22, 2006

(51) Int. Cl.
*H01M 8/02* (2006.01)
*H01M 8/04* (2006.01)

(52) U.S. Cl. ...................................... 429/26
(58) Field of Classification Search .............. 429/26
See application file for complete search history.

(56) References Cited

U.S. PATENT DOCUMENTS

| | | | |
|---|---|---|---|
| 5,537,956 A * | 7/1996 | Rennfeld et al. | 123/41.29 |
| 6,358,638 B1 | 3/2002 | Rock et al. | 429/13 |
| 2001/0045103 A1 | 11/2001 | Khelifa | 62/244 |
| 2001/0050191 A1 | 12/2001 | Ogawa et al. | 180/65.3 |
| 2004/0108148 A1 | 6/2004 | Vanderwees et al. | 180/65.1 |
| 2005/0175874 A1* | 8/2005 | Alessi et al. | 429/26 |
| 2005/0175875 A1* | 8/2005 | Nelson et al. | 429/26 |

OTHER PUBLICATIONS

U.S. Appl. No. 60/560,731, filed Feb. 9, 2004, Nelson et al.

* cited by examiner

*Primary Examiner*—Gregg Cantelmo
(74) *Attorney, Agent, or Firm*—Crowell & Moring LLP

(57) ABSTRACT

Improvements in freezing and sub-freezing startup time for an electrochemical fuel cell system may be observed by having a passive coolant microloop using two gear pump heads. During a cold start, a stack valve is initially fully closed and causes all system coolant arriving at the module to run through a driving gear pump head. This causes a driven gear pump head to recirculate coolant inside the module. In an embodiment, the stack valve is a thermostatic valve that begins to open as the coolant begins to warm up. This allows a small bleed of system coolant into the module and decreases the percentage of microloop recirculation. When operating temperature is reached, the thermostatic valve is fully open and system coolant inlet pressure on the driving gear pump head counteracts the pressure on the driven gear pump head, thus stopping recirculation.

18 Claims, 2 Drawing Sheets

PASSIVE MICROCOOLANT LOOP FOR AN ELECTROCHEMICAL FUEL CELL

BACKGROUND OF THE INVENTION

1. Field of the Invention

The present invention relates to electrochemical fuel cells and more particularly to subsystems and methods for controlling the temperature of a fuel cell system during startup.

2. Description of the Related Art

Electrochemical fuel cells convert reactants, namely fuel and oxidant fluid streams, to generate electric power and reaction products. Electrochemical fuel cells employ an electrolyte disposed between two electrodes, namely a cathode and an anode. The electrodes each comprise an electrocatalyst disposed at the interface between the electrolyte and the electrodes to induce the desired electrochemical reactions. The location of the electrocatalyst generally defines the electrochemically active area.

Polymer electrolyte membrane (PEM) fuel cells generally employ a membrane electrode assembly (MEA) consisting of an ion-exchange membrane disposed between two electrode layers comprising porous, electrically conductive sheet material as fluid diffusion layers, such as carbon fiber paper or carbon cloth. In a typical MEA, the electrode layers provide structural support to the ion-exchange membrane, which is typically thin and flexible. The membrane is ion conductive (typically proton conductive), and also acts as a barrier for isolating the reactant streams from each other. Another function of the membrane is to act as an electrical insulator between the two electrode layers. The electrodes should be electrically insulated from each other to prevent short-circuiting. A typical commercial PEM is a sulfonated perfluorocarbon membrane sold by E.I. Du Pont de Nemours and Company under the trade designation NAFION®.

The MEA contains an electrocatalyst, typically comprising finely comminuted platinum particles disposed in a layer at each membrane/electrode layer interface, to induce the desired electrochemical reaction. The electrodes are electrically coupled to provide a path for conducting electrons between the electrodes through an external load.

In a fuel cell stack, the MEA is typically interposed between two separator plates that are substantially impermeable to the reactant fluid streams. The plates act as current collectors and provide support for the electrodes. To control the distribution of the reactant fluid streams to the electrochemically active area, the surfaces of the plates that face the MEA may have open-faced channels formed therein. Such channels define a flow field area that generally corresponds to the adjacent electrochemically active area. Such separator plates, which have reactant channels formed therein are commonly known as flow field plates. In a fuel cell stack a plurality of fuel cells are connected together, typically in series, to increase the overall output power of the assembly. In such an arrangement, one side of a given plate may serve as an anode plate for one cell and the other side of the plate may serve as the cathode plate for the adjacent cell. In this arrangement, the plates may be referred to as bipolar plates.

The fuel fluid stream that is supplied to the anode typically comprises hydrogen. For example, the fuel fluid stream may be a gas such as substantially pure hydrogen or a reformate stream containing hydrogen. Alternatively, a liquid fuel stream such as aqueous methanol may be used. The oxidant fluid stream, which is supplied to the cathode, typically comprises oxygen, such as substantially pure oxygen, or a dilute oxygen stream such as air. In a fuel cell stack, the reactant streams are typically supplied and exhausted by respective supply and exhaust manifolds. Manifold ports are provided to fluidly connect the manifolds to the flow field area and electrodes. Manifolds and corresponding ports may also be provided for circulating a coolant fluid through interior passages within the stack to absorb heat generated by the exothermic fuel cell reactions. The preferred operating temperature range for PEM fuel cells is typically 50° C. to 120° C., most typically between 75° C. and 85° C.

Under typical conditions, start-up of the electrochemical fuel cell stack is under high ambient temperatures and the fuel cell stack can be started in a reasonable amount of time and quickly brought to the preferred operating temperature. In some fuel cell applications, it may be necessary or desirable to commence operation of an electrochemical fuel cell stack when the stack core temperature is below the freezing temperature of water and even at subfreezing temperatures below −25° C. However, at such low temperatures, the fuel cell stack does not operate well and rapid start-up of the fuel cell stack is more difficult. It may thus take a considerable amount of time and/or energy to take an electrochemical fuel cell stack from a cold starting temperature below the freezing temperature of water to efficient operation.

In U.S. Pat. No. 6,358,638, a method of heating a cold MEA to accelerate cold start-up of a PEM fuel cell is disclosed. In the '638 patent, either fuel is introduced into the oxidant stream or oxidant is introduced into the fuel stream. The presence of platinum catalyst on the electrodes promotes an exothermic chemical reaction between hydrogen and oxygen which locally heats the ion-exchange membrane from below freezing to a suitable operating temperature. However, this procedure can damage the MEA if it is not carefully controlled and there remains a need in the art for more efficient methods of starting a fuel cell stack at low and subfreezing temperatures.

In a cooling subsystem comprising a standard coolant loop and a startup coolant loop with a startup pump fluidly connected to the electrochemical fuel cell stack, a stack valve is closed during startup, such that the electrochemical fuel cell stack is fluidly isolated from the standard coolant loop. Coolant in the startup loop circulates through the fuel cell stack and helps to quickly bring the temperature of the stack up to desired temperature. However, the separate startup loop may require additional costly components such as the startup pump, isolation valves and control circuitry.

The present invention fulfills the need for a more efficient method for efficiently starting a fuel cell stack at low and subfreezing temperatures as described above. The present invention also allows for a subsystem with compact size, reduced cost, and reduced complexity versus a separate microloop and provides further related advantages.

BRIEF SUMMARY OF THE INVENTION

Significant improvements in start-up time from freezing or sub-freezing temperatures can be achieved by using a passive microcoolant loop cooling subsystem. For example, in an electrochemical fuel cell system, the cooling subsystem may comprise a startup coolant loop comprising a driving and driven set of gear pump heads mounted on a common shaft fluidly connected to the electrochemical fuel cell stack; a standard coolant loop comprising a standard pump and a stack valve, and a drive loop in the standard coolant loop such that coolant in the standard coolant loop flows through the driving gear pump head of the startup coolant loop.

During start-up, the stack valve is closed such that the electrochemical fuel cell stack is fluidly isolated from the standard coolant loop. Coolant in the standard coolant loop circulates through the driving gear pump head of the startup coolant loop by way of the drive loop. The driving gear pump head, in turn, drives the driven gear pump head. As there is no additional motor required to power the driving gear pump head, the startup coolant loop can also be described as a passive coolant loop. The driven gear pump head recirculates coolant in the fuel cell stack and helps to quickly bring the temperature of the stack to the desired temperature. If coolant did not flow through the stack, localized heating within the stack could detrimentally affect the stack. By minimizing the coolant volume in the startup loop, and in particular, by having a smaller coolant volume than in the standard coolant loop, more efficient heating can occur. In this manner, the start up coolant loop can also be described as a passive microcoolant loop.

A method for operating the coolant subsystem for an electrochemical fuel cell system during startup comprises: (a) directing a coolant through a driving gear pump head in a standard coolant loop; the pump driving a startup coolant loop (b) directing the coolant through a fuel cell stack in the startup loop; and (c) directing the coolant through the fuel cell stack when the temperature of either the electrochemical fuel cell stack or the coolant in the startup loop reaches a first predetermined temperature. The coolant in the standard coolant loop is fluidly isolated from the coolant in the startup coolant loop during the initial step (a). When the temperature of either the fuel cell stack or the coolant in the startup loop has reached the predetermined threshold value, the stack valve may be opened such that the electrochemical fuel cell stack becomes fluidly connected to the standard coolant loop and thereby allow additional cooling of the fuel cell stack.

In an embodiment, coolant from the standard coolant loop mixes with the coolant in the startup loop when the stack valve opens. This opening of the stack valve reduces the amount of coolant from the standard coolant loop available for driving the driving gear pump head; thus the percentage of coolant recirculation in the coolant loop is reduced. Once the operating temperature of the fuel cell stack is reached, the stack valve is fully opened and provides a minimal pressure drop. With the valve fully open, the pressure of the coolant in the standard coolant loop on the driving gear pump head is essentially equal to and counteracts the pressure exerted on the driven gear pump head; thus, the driving and driven gear pump heads stop rotating and recirculation in the startup coolant loop ceases.

In an embodiment, the first predetermined temperature is the desired operating temperature of the fuel cell system, for example, 60 to 80° C. In another embodiment, the predetermined temperature is less than the desired operating temperature, for example less than 60° C., more particularly less than 50° C. Typically such a predetermined temperature would be greater than 30° C. or greater than 40° C.

The startup loop may further comprise a heater to help quickly bring the temperature of the coolant up to desired temperature. To further minimize the coolant volume in the startup coolant loop, the loop comprising the driving and driven gear pump heads may be integrated into the stack manifold. Other components in the coolant subsystem may include a compressor, a cathode feed heat exchanger, or a radiator. If the fuel cell system is used in a motor vehicle, the coolant subsystem may further comprise a propulsion system and/or a car heating system.

These and other aspects of the invention will be evident upon reference to the attached figures and following detailed description.

BRIEF DESCRIPTION OF THE DRAWINGS

The provided FIGURES illustrate certain non-optimized aspects of the invention, but should not be construed as limiting in any way.

DETAILED DESCRIPTION OF THE INVENTION

Figure 1:
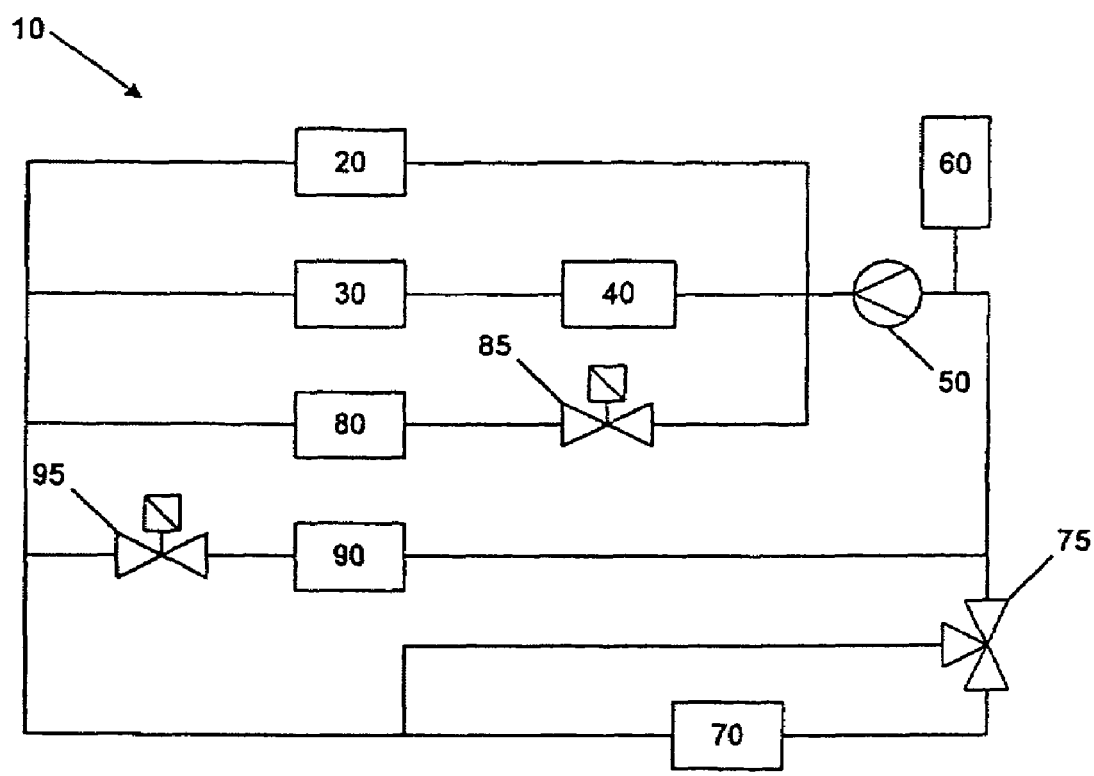
FIG. 1 is a schematic of a prior art coolant subsystem for an electrochemical fuel cell system.

FIG. 1 is a schematic of a conventional prior art electrochemical fuel cell system coolant subsystem 10. Electrochemical fuel cell system coolant subsystem 10 may comprise a pump 50 fluidly connected to a fuel cell stack 20, a compressor 30, a cathode feed heat exchanger 40 and a coolant reservoir 60. Coolant from coolant reservoir 60 can then be circulated through fuel cell stack 20, compressor 30 and cathode feed heat exchanger 40 to assist with temperature regulation of these components. In particular, with respect to compressor 30, temperature regulation of the compressor motor and the compressor inverter (not shown) may be desired, either individually or together. Temperature sensors (not shown) may measure the temperature of fuel cell stack 20 and/or the temperature of the coolant circulating through electrochemical fuel cell system coolant subsystem 10. The electrochemical fuel cell system coolant subsystem 10 may also comprise a radiator 70 and a radiator valve 75. Once the temperature of fuel cell stack 20 or the coolant exceeds a certain predetermined threshold, radiator valve 75 may direct the circulating coolant through radiator 70 to achieve additional cooling of the fuel cell system.

Other components may also be coupled to electrochemical fuel cell system coolant subsystem 10 as needed, particularly as used in automotive applications. For example, a propulsion system 80 may be reversibly fluidly connected to electrochemical fuel cell system coolant subsystem 10 by a propulsion valve 85. Similarly, a car heating system 90 may be reversibly fluidly connected to electrochemical fuel cell system coolant subsystem 10 by a car heating valve 95. Thus the same electrochemical fuel cell system coolant subsytem 10 used to regulate the temperature of fuel cell stack 20 may be used to regulate the temperature of a number of other components as needed.

Figure 2:
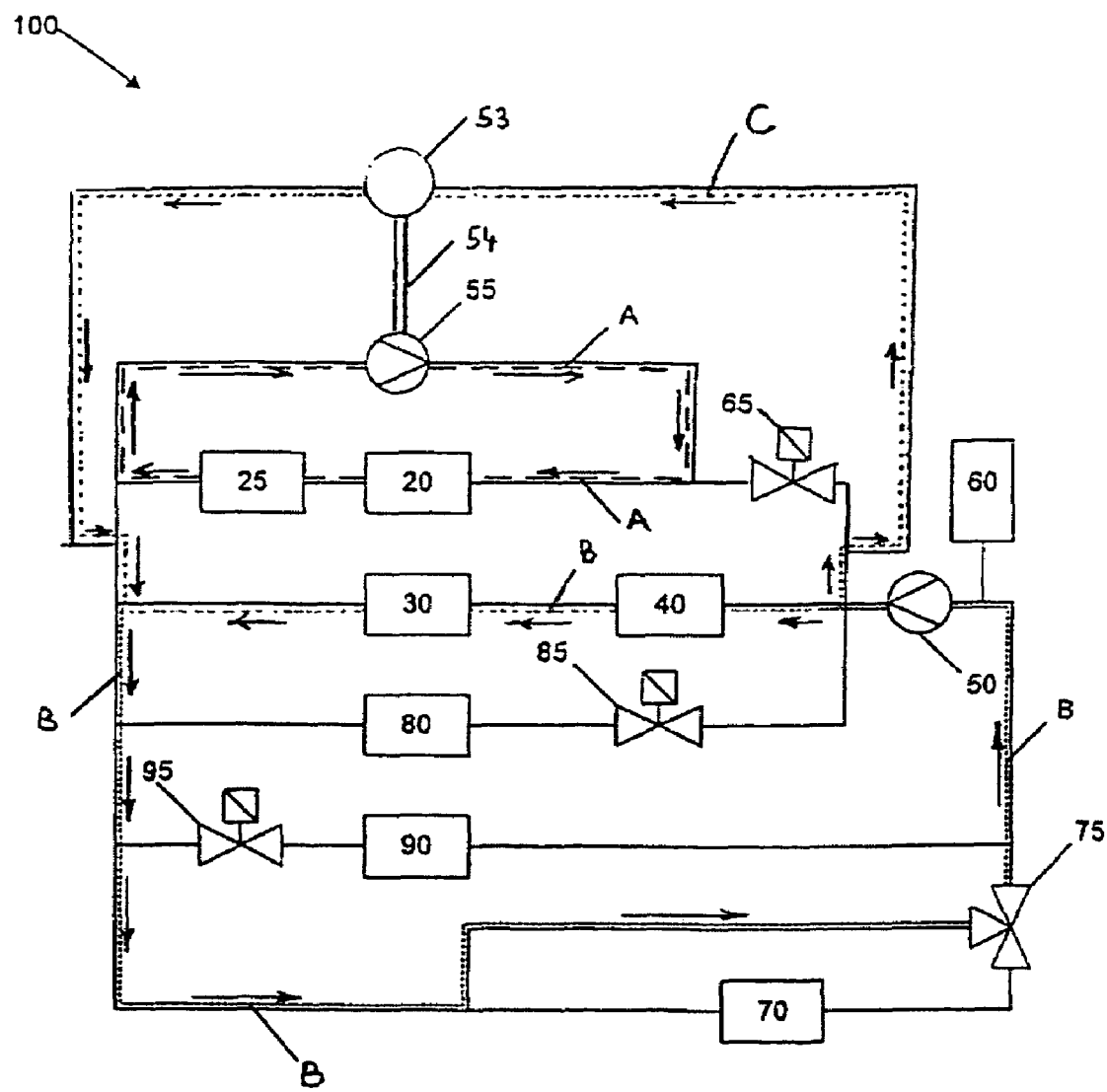
FIG. 2 is a schematic of an embodiment of a coolant subsystem for an electrochemical fuel cell.

FIG. 2 is a schematic of an embodiment of an electrochemical fuel cell system coolant subsystem 100. Pump 50 may circulate a coolant from coolant reservoir 60 through components of the fuel cell system such as compressor 30, cathode feed heat exchanger 40 and reversibly through other components such as radiator 70, propulsion system 80 and car heating system 90 as in the coolant subsystem illustrated in FIG. 1. This is illustrated in FIG. 2 as standard coolant loop B. Additionally, pump 50 may also circulate the coolant through driving gear pump head 53. This is illustrated in FIG. 2 as drive loop C.

Electrochemical fuel cell system coolant subsystem 100 additionally comprises a start-up coolant loop A, which may be reversibly fluidly isolated from standard coolant loop B and drive loop C by a stack valve 65. Stack valve 65 may be, for example, a thermostatic valve or a proportional valve. In particular, start-up coolant loop A may comprise fuel cell stack 20, a driven gear pump head 55 mounted on a common shaft 54, driven by driving gear pump head 53 of drive loop C, and an optional heater 25. The gear pump head, for example, may be any positive displacement pump that can be back-driven. Only one of the drive gears of the driving gear pump head may be torsionally connected to one of the pump gears of the driven gear pump head; the other drive gear and pump gear set can be free-wheeling.

During start-up of the fuel cell system, particularly when the system is subjected to freezing or sub-freezing temperatures, stack valve 65 may be closed such that coolant in coolant loop B drives the driving gear pump head 53 of drive loop C. The driving gear pump head then operates the driven gear pump head 55 through the mechanical connection of common shaft 54. The driven gear pump head then circulates the coolant through coolant loop A. Coolant loop B is fluidly isolated from coolant loop A and from the fuel cell stack 20 while stack valve 65 remains closed. During start-up procedures, coolant in both coolant loop A and in coolant loop B would increase in temperature, though coolant in loop B does not get heated by the stack while the stack valve 65 remains closed.

The relatively small volume of coolant in coolant loop A allows quick and efficient heating, particularly in comparison to coolant in coolant loop B. This may reduce the amount of time needed to bring fuel cell stack 20 to an appropriate temperature. In fact, with a reduced volume in coolant loop A, no preheating may be necessary in some embodiments and fuel cell stack 20 may self start at the freezing temperature. Typically, an appropriate temperature at which power can be pulled from fuel cell stack 20 would be at about 5° C. In other embodiments, heater 25 may also be used to heat coolant in coolant loop A and assist with bringing fuel cell stack 20 to this temperature.

At very cold temperatures, the viscosity of coolant in coolant loops A and B may be much higher than at warmer temperatures. This increased viscosity may affect the coolant flow rates and care should be taken that coolant loop B provides enough power to driving gear pump head 53 to maintain a sufficient coolant flow rate in coolant loop A. Otherwise localized heating may occur in fuel cell stack 20 leading to damage to individual cells from local overtemperature. However, when at freezing and sub-freezing temperature, the individual fuel cells in stack 20 may absorb a significant amount of the heat that is generated so even with the increased viscosity, the coolant flow rate can be significantly less than that required at normal operating conditions. The required flow rates are strongly dependent on stack design and materials and on the amount of heat generation in fuel cell stack 20 and can be easily determined by a person of ordinary skill in the art. Nevertheless, the coolant flow rate in coolant loop A during cold-start phase for a typical automotive fuel cell system can be as low as 5 to 25 µslpm (standard liters per minute), more particularly 15 to 25 slpm for an 85 kW gross fuel cell stack and still meet cell cooling requirements with no local hot spots.

As coolant in coolant loop A heats up, it may expand and an expansion reservoir in coolant loop A (not shown) may be used to accommodate the increased coolant volume. In the embodiment illustrated in FIG. 2, such an expansion reservoir may not be necessary as any excess volume may directly leak into coolant loop B as only one valve, namely stack valve 65 separates coolant loop A from coolant loop B. In any event, the pressure increase in coolant loop A due to the increased coolant volume would be expected to be minimal.

Heater 25 may also be used to heat coolant in coolant loop A and assist with bringing fuel cell stack 20 to an operating temperature. A heater may also be used in conventional coolant designs or in coolant loop B (not shown). While heater 25 may be useful in some fuel cell systems, some heaters may not have the necessary heat flux to compensate for the increased thermal mass of the coolant needed to accommodate the heater itself.

The thermal mass of the coolant in coolant loop A may be minimized further by integration of coolant loop A into the fuel cell stack manifold (not shown).

When the temperature of either the coolant in coolant loop A or fuel cell stack 20 has reached a threshold temperature, stack valve 65 may open to begin letting coolant from coolant loop B in to fuel cell stack 20. This opening of stack valve 65 reduces the amount of coolant B available for driving the driving gear pump head 53; thus the percentage of coolant recirculation in coolant loop A is reduced. The ratio of coolant recirculated in coolant loop A to coolant reaching the stack from coolant loop B is a function of the pressure drop across stack valve 65. The threshold temperature at which stack valve 65 begins to open, may be, for example, at or between 30 and 80° C. In an embodiment, the threshold temperature is a value at or between 60 and 80° C., i.e., the normal operating temperature of fuel cell stack 20. In this embodiment, fuel cell stack 20 reaches its desired operating temperature in the minimum amount of time allowing greater power density to be drawn from fuel cell stack 20 at an earlier time.

At lower temperatures, a fuel cell stack 20 can typically be subjected to higher temperature gradients without any adverse effects (for example, temperature gradients up to 30° C.). However, at 60 to 80° C., typical fuel cell stacks 20 can only safely be subjected to smaller temperature gradients, for example, less than 10° C. Accordingly, by having a lower threshold temperature (i.e., 30-60° C. instead of 60-80° C.) for letting coolant from coolant loop B into fuel cell stack 20, there is a reduced risk of damaging fuel cell stack 20 from thermal shock. Regardless of the threshold temperature, care should be taken to reduce the risk of thermal shock. This may be done, for example, by controlling the rate at which coolant from coolant loop B is introduced into coolant loop A.

When the normal operating temperature of fuel cell stack 20 is reached, the stack valve 65 should be fully open and provide a minimal pressure drop. With the valve fully open, the pressure of the coolant in coolant loop B on the driving gear pump head 53 is essentially equal to and counteracts the pressure exerted on the driven gear pump head 55; thus, the driving and driven gear pump heads stop rotating and recirculation in coolant loop A ceases. In this configuration, only coolant that can leak past the non-rotating gears of the gear pump heads can short around the fuel cell stack. This leakage can be minimized, and thus parasitic loads further reduced, by making the component tolerances sufficiently tight.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A cooling subsystem for an electrochemical fuel cell system having an electrochemical fuel cell stack, the cooling subsystem comprising:

a startup coolant loop fluidly connected to the electrochemical fuel cell stack, the startup coolant loop comprising a driving gear pump head and driven gear pump head mounted on a common shaft; and a standard coolant loop comprising a standard pump and a stack valve such that the standard coolant loop is fluidly connected to the electrochemical fuel cell stack when the stack valve is open and the standard coolant loop is fluidly isolated from the electrochemical fuel cell stack when the stack valve is closed; and a drive loop in the standard coolant loop such that a coolant in the standard coolant loop flows through the driving gear pump head of the startup coolant loop.

2. The cooling subsystem of claim 1 wherein the coolant volume in the startup coolant loop is less than the coolant volume in the standard coolant loop.

3. The cooling subsystem of claim 2 wherein the startup coolant loop is fluidly disconnected from the standard coolant loop when the stack valve is fully open.

4. The cooling subsystem of claim 2 wherein the startup coolant loop is fluidly disconnected from the electrochemical fuel cell stack when the stack valve is fully open.

5. The cooling subsystem of claim 2 wherein the standard coolant loop further comprises a compressor fluidly connected to the standard pump.

6. The cooling subsystem of claim 2 wherein the startup coolant loop further comprises a heater.

7. The cooling subsystem of claim 2 wherein the stack valve is a thermostatic valve.

8. The cooling subsystem of claim 2 wherein the stack valve is a proportional valve.

9. The cooling subsystem of claim 2 wherein the electrochemical fuel cell stack comprises a stack manifold and the startup coolant loop is integrated into the stack manifold.

10. The cooling subsystem of claim 2 wherein the standard coolant loop further comprises a cathode feed heat exchanger.

11. The cooling subsystem of claim 2 wherein the standard coolant loop further comprises a coolant reservoir.

12. The cooling subsystem of claim 2 wherein the standard coolant loop further comprises a radiator.

13. The cooling subsystem of claim 12 further comprising a radiator valve such that when the radiator valve is open, the radiator is fluidly connected to the standard coolant loop and when the radiator valve is closed, the radiator is fluidly isolated from the standard coolant loop.

14. The cooling subsystem of claim 2 wherein the standard coolant loop further comprises a propulsion system.

15. The cooling subsystem of claim 14 further comprising a propulsion valve such that when the propulsion valve is open, the propulsion system is fluidly connected to the standard coolant loop and when the propulsion valve is closed, the propulsion system is fluidly isolated from the standard coolant loop.

16. The cooling subsystem of claim 2 wherein the standard coolant loop further comprises a car heating system.

17. The cooling subsystem of claim 16 further comprising a car heating valve such that when the car heating valve is open, the car heating system is fluidly connected to the standard coolant loop and when the car heating valve is closed, the car heating system is fluidly isolated from the standard coolant loop.

18. An electrochemical fuel cell system comprising the cooling subsystem of claim 2.

* * * * *